May 2, 1950 R. H. LINDSEY 2,506,227
TOOL FOR USE IN CLEANING FISH
Filed Dec. 26, 1947

INVENTOR.
RICHARD H. LINDSEY
BY
ATTORNEYS.

Patented May 2, 1950

2,506,227

UNITED STATES PATENT OFFICE 2,506,227

TOOL FOR USE IN CLEANING FISH

Richard H. Lindsey, Detroit, Mich.

Application December 26, 1947, Serial No. 793,797

2 Claims. (Cl. 17—8)

This invention relates to a tool for holding fish and it has to do particularly with a tool useful in the process of cleaning fish and particularly in the scaling of fish.

Equipment of all kinds and types are available to sportsmen for catching fish, and for the temporary stowing and transporting of the catch from the field of action to the home or camp or other headquarters. The sport or art of catching fish is participated in by many thousands of people and it, indeed, provides an activity which is both a sport and a means of relaxation.

While much thought has been given to the provision of various kinds of equipment for the catching of fish, very little has been done from the standpoint of handling the fish after the catch has been brought in. The scaling of the fish is a particularly difficult operation, especially for those who are not adept in the matter and the scaling of the fish is ofttimes left to some one other than the fisherman or sportsman. One difficulty is that of holding and manipulating the fish while it is being scaled.

The object of the present invention is to provide a tool by means of which a fish may be held securely and manipulated as is necessary while it is being scaled or otherwise cleaned or trimmed. The tool is so arranged as to effectively grip and hold the fish and it is further arranged so that if the fish is alive, the tool serves as an instrument for killing the fish. To this end, the tool embodies articulated parts for gripping the head of the fish and for penetrating the head, if necessary or desired, and the tool is capable of use with a fish of the smallest legal size, to a fish as large as those usually encountered in streams and inland lakes but may be made in any desired size.

A tool constructed in accordance with the invention is shown in the accompanying drawing and in these drawings.

Figures 4, 5:
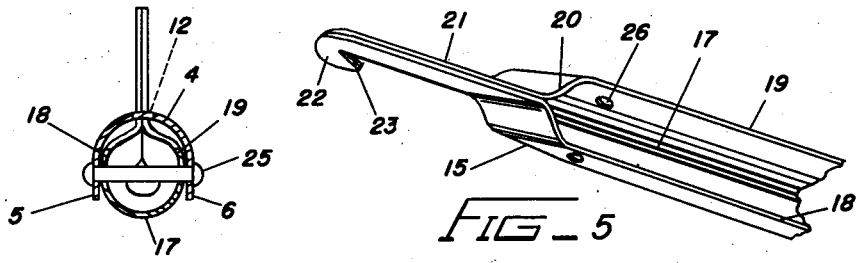
Fig. 4 is a sectional view taken substantially on line 4—4 of Fig. 1.
Fig. 5 is a perspective view of one element of the tool.

The tool is preferably constructed so that its usefulness is particularly effective and at the same time it is preferably of a simple design and of rugged construction. It resides primarily in two elements articulated together, pincher fashion. One element generally illustrated at 1 is conveniently formed of sheet-like metal having a handle portion 2 and a projection portion or tine 3. This member is formed so that in cross section, as illustrated in Fig. 4, it has a curved or bight portion 4 with side portions 5 and 6. The U-shaped form is preferably of varying depth with the deepest part in the central portion of the member. The tine 3 is preferably formed so that it tapers as illustrated in both Figures 1 and 2. This is accomplished by the side portions 5 and 6 being formed to incline or taper as shown at 10 toward the tip 11 of the tine, and as shown in Fig. 2, the cross dimension of the bight portion gradually decreases so that it tapers toward the end of the tine. The bight portion 4 is provided with a slot 12.

The other cooperating member is generally illustrated at 15 and it is formed with a handle portion 16 fashioned from sheet metal stock having a bight portion 17 and sides 18 and 19. The two sides 18 and 19 are fashioned so as to converge toward each other as illustrated at 20 and the two side portions project beyond the bight portion 17. The two bight portions lie in interfacial relationship and form a projecting clamping member 21. The end of the clamping member is preferably provided with a hook formation 22 with an inclined face 23. The two members are preferably made from metal stock of corrosion resisting character such as stainless steel, Monel metal or the like.

The two members of the tool are placed together in the manner shown with the clamping member 21 passing through the aperture 12 and the members are assembled together by a suitable fulcrum or pivot shown herein as a rivet 25. This rivet is passed through apertures formed in the side portions of the U-formation of the two elements. The apertures in the element 15 are shown at 26.

The cross dimension of the element 15 is such that it fits nicely within the U-formation of the element 1, as shown in Fig. 4. The bight portions provide rounded surfaces for the handles 2 and 16 so that the tool may be effectively gripped and manipulated. The aperture 12 is properly positioned with respect to the location of the rivet 25 to provide for articulation of the two members and for movement of the clamping portion 21 in the aperture. The arrangement is preferably such that the hook portion 22 may be brought down against the tine 3. The end of the aperture adjacent the rivet conveniently serves to limit the extent of the opening pivotal movement of the tool; that is to say, the swinging movement of the element 15 relative to the element 1 in a clockwise direction, as Fig. 1 is viewed, is limited by the engagement of the clamp portion 21 with the end of the aperture 12.

Figure 1:
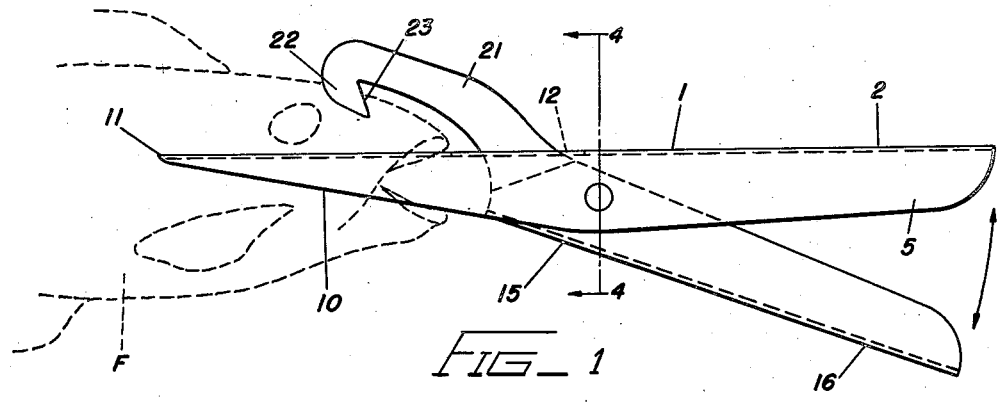
Fig. 1 is a view illustrating the tool as applied to a fish with the fish being shown in dotted lines.
Figure 2:
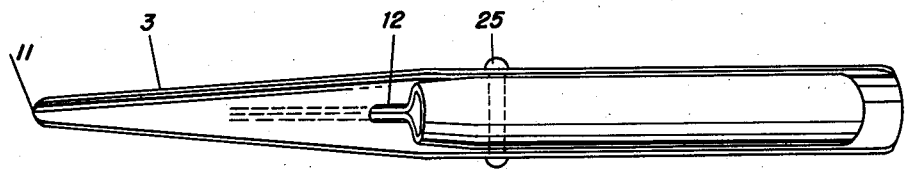
Fig. 2 is a plan view of the underside of the tool.
Figure 3:
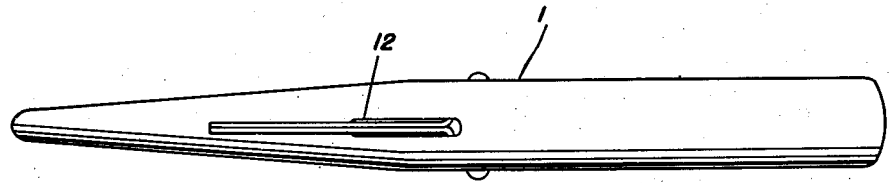
Fig. 3 is a top plan view.

The manner of use of the tool is demonstrated in Fig. 1 wherein the fish, at F, is illustrated in dotted lines with the tool applied thereto. In applying the tool to the fish the tine 3 is inserted through the mouth of the fish and into the gullet and then the operator, by grasping the handles 2 and 16 and urging the same toward each other, causes the hook 22 to engage and penetrate into the skull of the fish. If the fish happens to be still alive at this time, this action serves to instantly kill it. This, of course, is desirable before the scaling operation is commenced. The inclination of the face 23 of the hook effectively holds the fish. By maintaining the grasp on the handles 2 and 16, the operator may manipulate the fish and flip it from side to side as it is being scaled, and as the fish is otherwise being prepared, cleaned or trimmed within the desires of the particular user. The tool has proven particularly desirable in use on fish in various sizes, as above mentioned, and it materially simplifies the heretofore vexing problem of handling and manipulating a slippery fish while being scaled or otherwise cleaned.

The tine-like projection materially facilitates the manipulation of the fish and the turning of the fish from side to side. The tine projects substantially into the gullet of the fish to thereby lend its rigidity to the body of the fish so that while the fish is actually gripped in the head, the body of the fish is maintained reasonably immovable on the tine particularly if the fish is not too large.

I claim:

1. A tool for holding a fish while the fish is being scaled or otherwise cleaned or trimmed comprising, an elongated member formed of sheet metal and substantially of U-shape in cross section, one end of the member constituting a handle portion, the other end of the member being of tapering form and providing a projecting tine-like portion, a second member formed of sheet metal and having a handle portion substantially of U-shape in cross section and having a clamping portion extending from the handle portion and comprised of extensions of the sides of the U lying substantially in interfacial relationship, means pivotally mounting the members together in their intermediate portions with the U-shaped handle portion of the second member lying within the U-shaped handle portion of the first named member and with the bight portions of the handle portions facing away from each other, the first member having an aperture through which the clamping portion of the second member extends, the tine-like portion of the first member adapted to be inserted into the gullet of the fish and the clamping portion adapted to engage the head of the fish, said clamping portion having a reversely extending hook-like projection adapted to penetrate into the head of the fish.

2. A tool for holding a fish while the fish is being scaled or otherwise cleaned or trimmed comprising, an elongated member formed of sheet metal and substantially of U-shape in cross section, one end of the member constituting a handle portion, the other end of the member being of tapering form and providing a projecting tine-like portion, said member having an elongated narrow lengthwise extending slot intermediate its ends, a second member formed of sheet metal and having a handle portion substantially of U-shape in cross section, two extensions of sheet metal contiguous to the two legs of the U-shape projecting from the handle of the second member and being disposed in face to face engagement and extending laterally from the center line of the handle portion to provide a relatively thin clamping portion, said members being disposed together with the handle portion of the second member fitting within the handle portion of the said one member and with the bight portions of the handle portions facing away from each other, the said relatively thin clamping portion extending through the slot so as to overlie the concaved surface of the tapered tine-like portion, means pivotally connecting the members, the tine-like portion of the first member adapted to be inserted into the gullet of the fish and the clamping portion adapted to engage the head of the fish, said clamping portion having a hook like projection adapted to penetrate into the head of the fish.

RICHARD H. LINDSEY.

REFERENCES CITED

The following references are of record in the file of this patent:

UNITED STATES PATENTS

| Number | Name | Date |
| --- | --- | --- |
| 2,015,262 | Flagg et al. | Sept. 24, 1935 |
| 2,298,580 | Miron | Oct. 13, 1942 |